Figure 1:
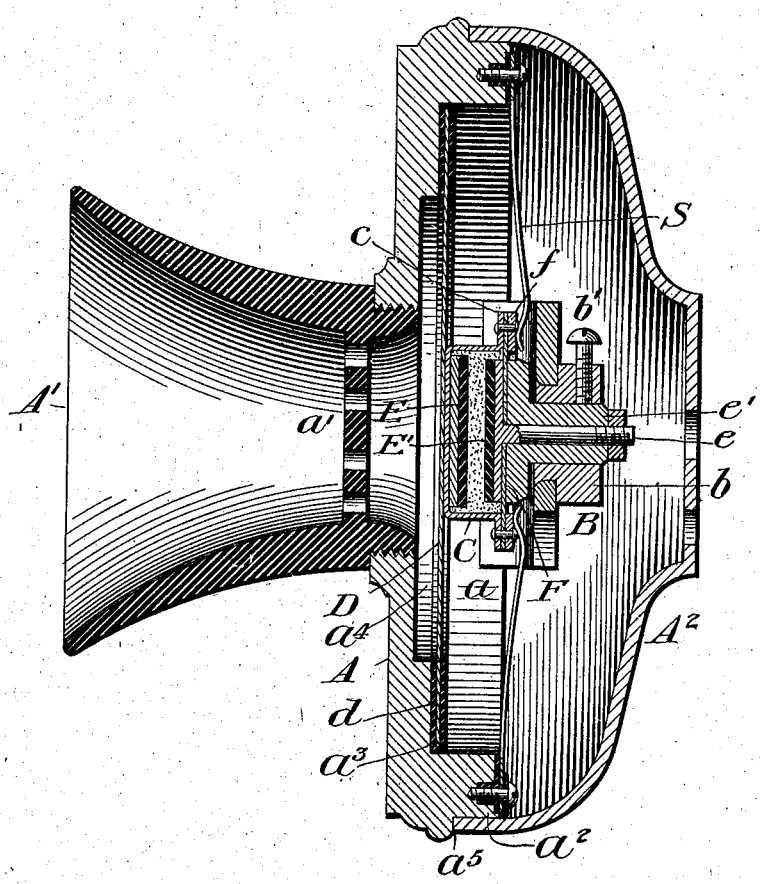

No. 823,768. PATENTED JUNE 19, 1906.
W. W. DEAN.
TELEPHONE TRANSMITTER.
APPLICATION FILED SEPT. 13, 1904.

2 SHEETS—SHEET 1.

Witnesses:
R. A. Baldwin
James H. Marr

Inventor:
William W. Dean,
by Edward E. Clement
att.

No. 823,768. PATENTED JUNE 19, 1906.
W. W. DEAN.
TELEPHONE TRANSMITTER.
APPLICATION FILED SEPT. 13, 1904.

2 SHEETS—SHEET 2.

Witnesses:
R A Baldwin
James H Man

Inventor:
William W. Dean
by Edward E. Clement
atty

UNITED STATES PATENT OFFICE.

WILLIAM W. DEAN, OF ELYRIA, OHIO, ASSIGNOR TO THE DEAN ELECTRIC COMPANY, OF ELYRIA, OHIO, A CORPORATION OF OHIO.

TELEPHONE-TRANSMITTER.

REISSUED

No. 823,768.  Specification of Letters Patent.  Patented June 19, 1906.

Application filed September 13, 1904. Serial No. 224,299.

*To all whom it may concern:*

Be it known that I, WILLIAM W. DEAN, a citizen of the United States, residing at Elyria, in the county of Lorain and State of Ohio, have invented certain new and useful Improvements in Telephone-Transmitters, of which the following is a specification, reference being had therein to the accompanying drawings.

My invention relates to telephone-transmitters, and more particularly to microphones in which granular or finely-divided material, such as powdered carbon, is used as the resistance-varying medium.

It has for its object the production of an instrument of this class in which the parts shall be easy to assemble and adjust without any sacrifice of accuracy or exactness and which shall be highly sensitive and efficient when assembled and adjusted.

The highest type of granular transmitter known in the art to-day is that having a separate resistance-chamber or "button" containing the electrodes and the granular material supported in proximity to the diaphragm, which is usually directly connected to one of the electrodes, while the other is rigidly fixed, being attached to the frame of the instrument by means of a bridge or its equivalent. This type has been developed in many forms and is widely used commercially. In spite of this it is subject to certain drawbacks and defects inherent in the general design which prevent the attainment of full efficiency. I have discovered some of these defects and in the design presented herewith have removed them, with the result that my improved transmitter is not only of very high efficiency in individual instances, as well as easy to assemble and adjust, but its high efficiency and the adjustments are uniform in all instruments of the type.

One defect inherent in the transmitters heretofore used is the attachment of the diaphragm to the front electrode through a central and very small portion of its superficial area. While the greatest amplitude of vibration theoretically exists at this point, there is never a sufficient area of connection to communicate positively a considerable amount of vibrant force. I remedy this by making a contact connection between the electrode-back and the diaphragm of substantially the area of the electrode. Another defect is in the positive connections of both electrodes. In case of a very small variation in drilling or assembling or in the punch that produces the central opening in the diaphragm the parts will not aline perfectly, and as the button is assembled separately, with its two stems presumably perfectly alined, there is a final slight distortion of the auxiliary diaphragm which creates a normal compression strain on one side of the chamber and the diaphragm and a tension strain on the other. The result is a drop in the individual instrument and lack of uniformity in the type. Another defect is the fixed character of the ordinary containing-cup, which permits the granules therein to pack or to be packed. It is a well-known fact that in the best "solid-back" transmitters a packed condition of the carbon may be produced by placing the lips to the mouthpiece and exhausting the air from in front of the diaphragm. The latter buckles forward, the carbon drops into a mass, and when the diaphragm through its own resilience goes back into normal position the carbon is compressed into almost solidity. It is impossible to purposely pack my instrument and practically impossible to pack it through continued use, as I cause the containing-cup to move with the diaphragm, but do not fasten it thereto. Any forced movement of the diaphragm leaves the cup behind, therefore, while ordinary packing is prevented by the constant agitation of the mass of granules. Another defect is in the lack of proper tension of the diaphragm. In a free diaphragm supported but not confined at the edges there is a certain dead zone in its travel, a certain space extending either side of the central plane where the molecules of the metal are under practically no strain, or what strains there may be on opposite sides are balanced, and therefore nullified. As the diaphragm swings one way a compression strain is exerted on the inside and a tension on the outside skin, its resilience depending upon this phenomenon. In the dead space there is no resilience. The diaphragm is dead, and the travel through that space, twice for each vibration, is equivalent to lost motion, so far as activity is concerned. This is partly overcome by the well-known "damper-springs;" but these are not symmetrically placed, and their use is entirely without any understanding of the principle I have discovered. I remedy this defect by putting the center of the diaphragm under a strain symmetrical at all times and useful in a secondary function of maintaining contact between the electrode-cup and the diaphragm. Other defects might be pointed out; but these are many of the apparent, and the method of overcoming them will also be apparent from my detailed description. One feature of my transmitter should be mentioned here, however. By having no positive connection to the diaphragm from the cup or front electrode I have self-centering parts which cannot get out of alinement. Hence adjustments are uniform. Slight inequalities in the thickness of diaphragms are also taken up by the springs in adjusting, and the instrument is capable of a very fine adjustment, with high efficiency and great consequent sensitiveness.

My invention is illustrated in the accompanying drawings, in which—

Figure 2:
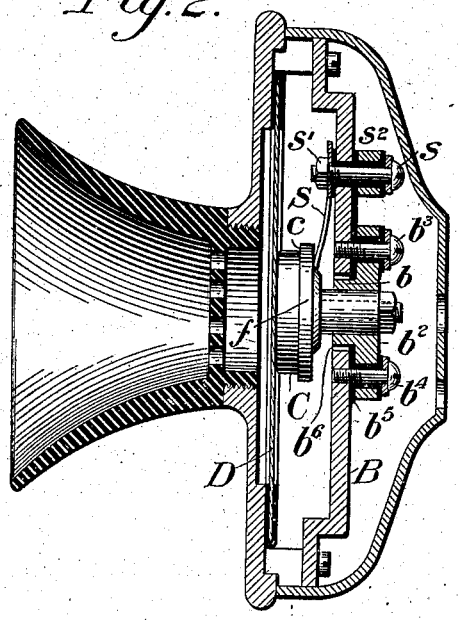
Figure 3:
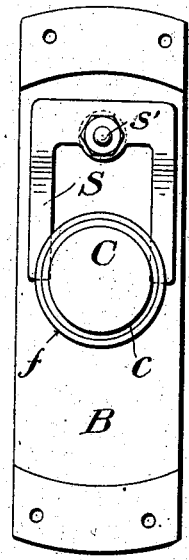

Figure 1 is a sectional view of a granular transmitter embodying my improvements. Fig. 2 is a similar view of a modified form thereof, showing a preferred arrangement of the contact-springs and connections; and Fig. 3 is a detail view of the bridge and springs shown in Fig. 2.

In Fig. 1, A is a circular front plate, usually a casting, centrally apertured and screw-threaded to receive the mouthpiece A'. This is preferably of hard rubber and is provided with the perforated septum $a'$, adapted to protect the diaphragm of the instrument. The plate A upon its rear side is provided with an annular face $a^3$ to receive the diaphragm D, and in front of the diaphragm it is slightly recessed, as at $a^4$, to form a sound-chamber. Around the periphery of the plate I provide the rearwardly-extending flange $a^2$ and the surrounding bead $a^5$. Extending from side to side and secured at opposite sides to the flange $a^2$ is the bridge B, to which the resistance-button is connected. Extending about and inclosing the bridge and the working parts of the instrument is the shell $A^2$, which takes over and is secured to the flange $a^2$ and abuts against the bead $a^5$, thereby producing a neat finish. This shell has its central portion flattened, as shown, and provided with suitable apertures, so that it may be secured to the end of a hollow supporting-arm the conductors from which may pass into the shell and be secured to the respective circuit-terminals of the instrument. Between the bridge B and the diaphragm D lie the working parts of the transmitter. These consist of the front and back electrodes E and E', inclosed in a rigid cup or casing C, which rests against the diaphragm. The front electrode E is secured directly to the inner circular wall of the cup, while the rear electrode E' is carried upon a stem $e$, secured in the stud $e'$, which in turn is rigidly held in the bridge. For the purpose of securing this stud firmly and in proper alinement the bridge is provided with a raised boss $b$, which may be integral therewith, but is shown as a separate piece secured thereto. This boss is centrally drilled to receive the stud and carries a set-screw $b'$, by which it may be locked rigidly in position when adjusted. The electrodes are metal plates with polished hard carbon faces, and between them I dispose granular material, such as carbon, in the usual manner. In order to close the casing surrounding the electrodes and also to add to the resilience of the vibrating parts, I provide the auxiliary diaphragm F, which I preferably form of mica or other insulating material not readily affected by heat and of an elastic nature. This is in the shape of a perforated disk slipped upon the stem $e$ and firmly clamped between the electrode-plate E' and the flat head of the stud $e'$. The disk extends out around the electrode and overlies the peripheral flange $c$, formed on the cup C, being clamped thereto by means of a metal ring $f$ and suitable screws or rivets. In Fig. 1 I have shown the flange and ring riveted together, and in Fig. 2 I have shown the ring threaded and screwed on the flange. The cup C rests with its bottom against the diaphragm D, being maintained in intimate contact therewith by means of springs S S, secured to and extending out from the flange $a^2$ and having their inner ends respectively raised upon opposite sides of the ring $f$. I usually insulate these springs from the flange $a^2$, using them as a part of the circuit for the instrument for making electrical connection with the cup, and thereby one of the electrodes, and I may increase or decrease their tension by changing somewhat their degree of curvature. They are preferably made of rather stiff spring metal, such as German silver, and I prefer to make the cup C and the ring $f$ of aluminium, so that little is to be feared from corrosion. In assembling this instrument the diaphragm is insulated by the soft-rubber band $d$, which is sprung around its periphery and is held in place by the usual side springs. (Not shown in Fig. 1.) The separate damper-springs commonly used with this type of transmitter I find I do not need, the springs S performing their function perfectly. In fact, the damping action of the springs S being symmetrical and communicated to the diaphragm over a suitable central area is much superior to that of the ordinary springs, and from this springs a part of the superiority of my instrument. After the diaphragm is in place the cup C, held against it by the springs S and the bridge B, secured to its flange, the correct normal relative positions of the parts are determined by moving the stud $e'$ in the boss $b$, and the adjustment is then rendered permanent by setting up the screw $b'$. The operation of this form of transmitter is sufficiently apparent from the illustration and description. The cup C is not supported upon the diaphragm, nor is it positively connected thereto, yet the springs S maintain a sufficiently intimate contact and a heavy enough pressure to insure most excellent transmission of the vibratory motions of the diaphragm to the cup and its movable electrode E. It will be observed that the parts are self-centering, that the carbon granules in the cup C are constantly agitated to prevent their packing, and that no abnormal or violent movements of the diaphragm will affect the cup C or its contents, for the reason that the movements of the cup are limited by the mica disk F, as well as by its own inertia, the latter, however, being small.

In Fig. 2 I have shown a similar construction, with the exception that all circuit connections are insulated from the bridge or the shell of the transmitter. This is a point of some importance in a transmitter to be used in common battery systems, as it is now common to employ potential differences of forty to fifty volts between the central-office terminals. With such voltages and considerable self-induction in the circuits it is quite possible to obtain annoying shocks in the use of a telephone—as, for instance, by grasping the transmitter-shell with one hand and touching the switch-hook with the other if both are uninsulated as regards the main circuit. By the construction shown in Figs. 2 and 3, however, I do away with all danger of shocks. In these figures the working parts are all the same as described in connection with Fig. 1. Instead of having the springs S extend from the side flange, however, I make these springs in one integral U-shaped piece and secure them beneath the bridge by a bushed screw-bolt and nut $s\ s$, the construction being such that a strong mechanical connection is produced, as well as a thoroughly-insulated binding-post. The central boss $b$ is in this case carried upon a plate $b^2$, separated from the bridge but attached thereto by the bushed screws $b^3$ and $b^4$. Between the plate and the bridge and extending also beneath the insulated post $s^2$ is a sheet of insulating material, such as hard rubber, $b^5$. The central boss $b$ lies in an opening $b^6$ in the bridge large enough to give a clearance all around the boss, so that any accidental contact in assembling is impossible. The circuit of the instrument as thus constructed is to the screw $s$, double spring S, screw-ring $f$, flange $c$, cup C, electrode E, through the granular carbon to electrode $E'$, through the stem $e$ and the stud $e'$ to the boss $b$ and plate $b^2$, and out. All the parts included in this circuit are insulated, so that the line has absolutely no connection with the shell of the instrument.

Having thus described my invention, it will be apparent how I have attained my objects. The first defect mentioned above is overcome by the large area of contact between the diaphragm and the vibrating cup. The second and third objections are obviated by making the parts self-centering and by disconnecting the cup from the diaphragm entirely. The fourth defect is removed by supplying the tension-springs S, which do away with the dead-point in vibration of the diaphragm.

My transmitter has many advantages not herein specifically mentioned and which become apparent upon considering the method of construction.

I am aware that many changes may be made in matters of detail without sacrificing these advantages as long as the principal features of the invention are attained, and it is therefore to be understood that all such changes and modifications are contemplated by me as fully within the scope and purview of my invention.

Having thus described my invention, what I claim, and desire to secure by Letters Patent, is—

1. In a telephone-transmitter, a vibrating diaphragm, an independently-supported cup having an electrode, springs pressing said cup against the diaphragm, a second electrode independently and rigidly fixed with respect to the first, and granular conducting material between the electrodes in the cup.

2. In a telephone-transmitter, a vibrating diaphragm, a containing-cup separately supported but vibrating with the diaphragm, an electrode seated in said cup, a second electrode fixed with respect to the first and extending into the cup, together with granular conducting material in the cup between the electrodes, substantially as described.

3. In a telephone-transmitter, a vibrating diaphragm, a containing-cup spring-pressed against the diaphragm, an electrode seated in said cup, a second electrode rigidly fixed with respect to the first and extending into the cup, together with granular conducting material in the cup between the electrodes, substantially as described.

4. In a telephone-transmitter, a vibrating diaphragm, a containing-cup independently supported but vibrating with the diaphragm, one electrode seated in said cup, a second electrode fixed wth respect to the first, an auxiliary diaphragm peripherally secured to the edge of the cup and connecting the same with the fixed electrode, together with granular conducting material in the cup and between the electrodes, substantially as described.

5. In a telephone-transmitter, a vibrating diaphragm, an independently-supported containing-cup spring-pressed against the diaphragm, an electrode seated in the cup, a second electrode fixed wth respect to the first, an auxiliary diaphragm peripherally secured to the cup and centrally secured to the fixed electrode, together with granular conducting material in the cup and between the electrodes, substantially as described.

6. In a telephone-transmitter, a diaphragm, a pair of electrodes, and a containing-cup therefor, one electrode vibrating with the diaphragm and the other fixed in a suitable support, a contact-spring secured to but insulated from said support and pressing against the conducting parts connected with the movable electrode, together with means to insulate the fixed electrode from the support, whereby circuit may be made through the electrodes without passing through the supporting parts, substantially as described.

In testimony whereof I affix my signature in presence of two witnesses.

WILLIAM W. DEAN.

Witnesses:
RAY H. MANSON,
I. A. BEYLAND.